June 15, 1965     C. E. TACK     3,188,979
RAILWAY TRUCK

Filed Aug. 7, 1961                       2 Sheets-Sheet 1

INVENTOR.
Carl E. Tack
BY Walter L. Schlegel, Jr.
Atty.

Witness:
C H Bassett

June 15, 1965   C. E. TACK   3,188,979
RAILWAY TRUCK
Filed Aug. 7, 1961   2 Sheets-Sheet 2
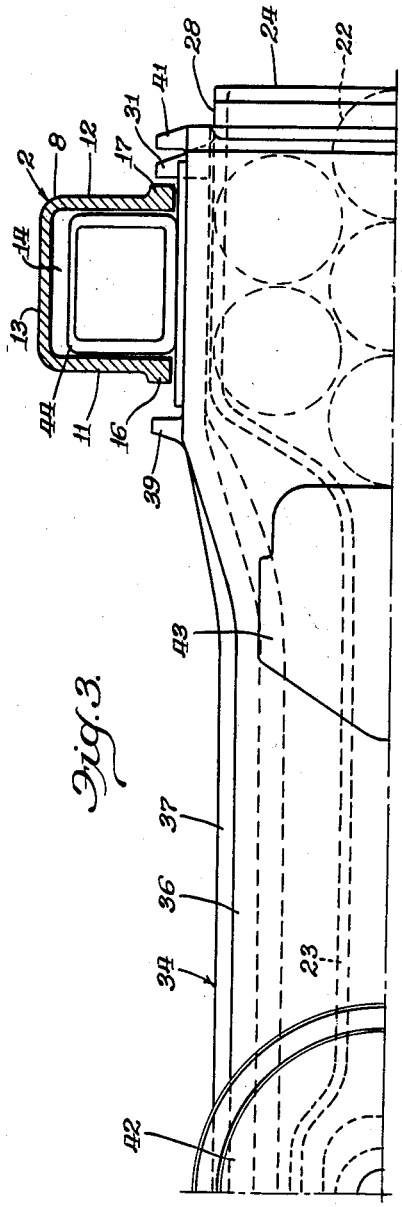
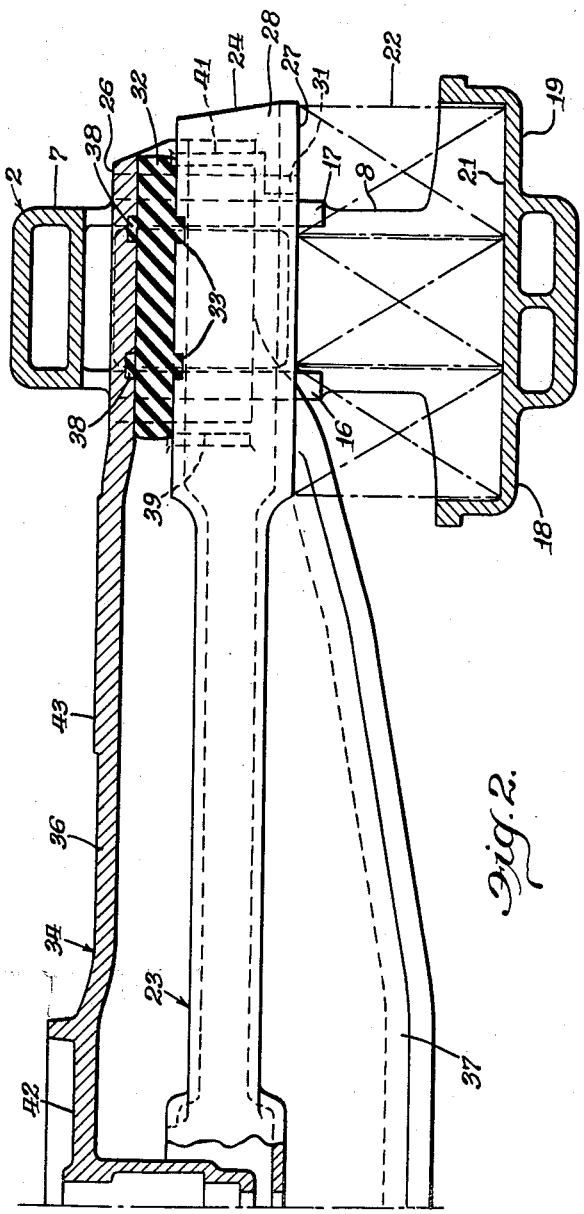
INVENTOR.
Carl E. Tack
BY Walter L. Schlegel Jr.
Atty.
Witness:
C H Bassett

United States Patent Office 3,188,979
Patented June 15, 1965

3,188,979
RAILWAY TRUCK
Carl E. Tack, Elmhurst, Ill., assignor to Amsted Industries Incorporated, Chicago, Ill., a corporation of New Jersey
Filed Aug. 7, 1961, Ser. No. 129,805
7 Claims. (Cl. 105—197)

This invention relates to railway trucks and more particularly to a truck structure in which a bolster is resiliently mounted for vertical and longitudinal movements upon spaced side frames which, in turn, are supported upon wheel and axle assemblies.

During transportation of goods on conventional railway cars, weaving or axial movements of the wheel and axle assemblies causes lateral movements of the car body and could result in damage to the goods. The present invention contemplates the provision of a truck structure in which forces causing axial movements of the wheel and axle assemblies do not cause corresponding lateral movements of a car body supported on the truck.

It is, therefore, an object of the invention to provide a truck structure in which the wheel and axle assemblies and side frames are movable laterally relative to the bolster and car body supported thereon.

Another object of the invention resides in the provision of a truck structure in which the side frames are interconnected by a spring seat tie member, and a bolster is resiliently supported at its ends upon said tie member.

A further object of the invention resides in the provision of a truck structure in which pads of resilient material, such as rubber, are interposed between the tie member and the bolster adjacent the ends thereof to yieldably resist relative longitudinal movements of the bolster and tie member.

Another object of the invention resides in the provision of a railway truck embodying means to dampen vertical and longitudinal movements of the bolster relative to the side frames.

The invention embodies other novel features, details of construction and arrangement of parts which are hereinafter set forth in the specification and claims and illustrated in the accompanying drawings, forming part thereof, wherein:

FIGURE 2 is a transverse section taken along the line 2—2 of FIGURE 1;

FIGURE 3 is a section taken along the line 3—3 of FIGURE 1;

Figure 1:
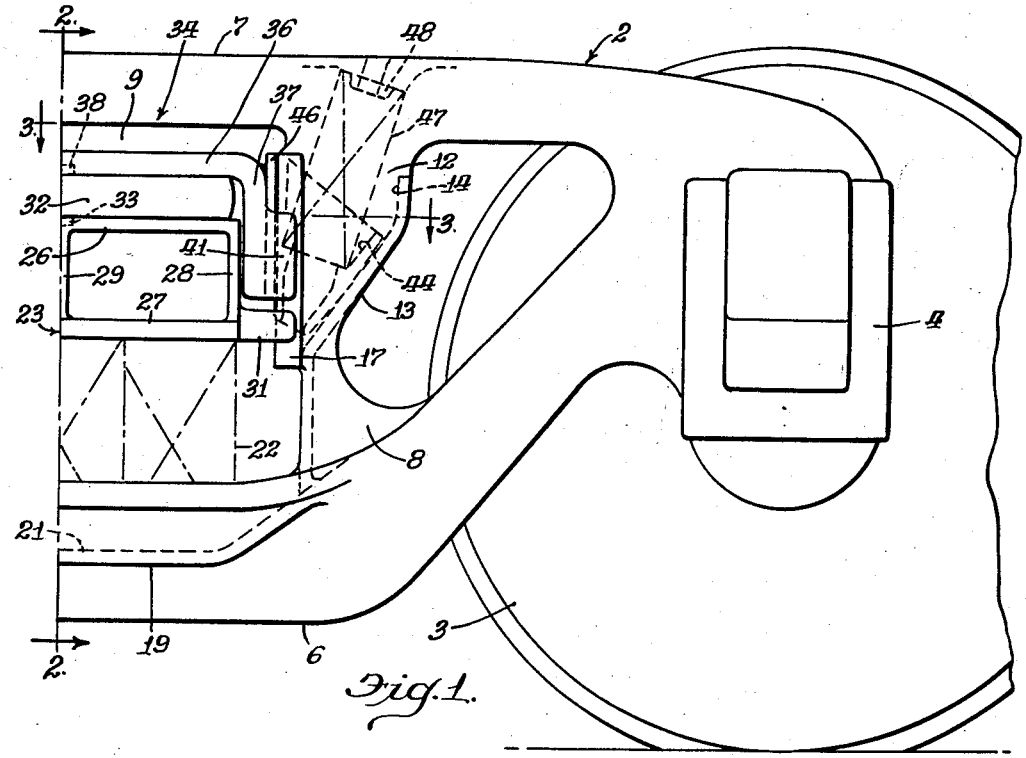
FIGURE 1 is a side elevation showing one end of a railway truck embodying features of the invention, only one-half of the truck being shown as it is symmetrical about its longitudinal and transverse center lines.

Referring now to the drawings for a better understanding of the invention and more particularly to FIGURES 1 to 3 therein, the truck structure is shown as comprising spaced side frames 2 supported at their ends upon wheel and axle assemblies 3 journaled for free rotational and limited axial movement in conventional journal boxes 4 provided on the ends of the side frames. Each side frame 2 comprises tension and compression members 6 and 7 interconnected by spaced columns 8 to define a window 9.

Each column comprises spaced inboard and outboard walls 11 and 12 interconnected by an inclined wedge wall 13 to define a friction shoe pocket 14. Vertically extending guide surfaces 16 and 17 are formed on the walls 11 and 12, respectively, along opposite sides of the pocket 14. Inboard and outboard ledges 18 and 19 are provided on the tension member 6 between the columns 8 to form a spring seat 21 for a group of helical compression springs 22.

The side frames 2 are interconnected by a transverse tie member 23 which is shown in the form of a casting having enlarged tubular ends 24, each end comprising a top wall 26, a bottom wall 27, side walls 28 and a central partition 29. Outboard guide lugs 31 are provided on the sidewalls 28 to extend alongside of the outboard guide surfaces 17 on the columns 8 to limit lateral outboard movement of the side frames 2 relative to each other. The tie member 23 is resiliently supported at its ends 24 upon the spring groups 22.

Pads 32 of resilient material, such as synthetic rubber, are mounted on the top walls 26 of the ends 24 of the tie member and are formed with lugs 33 for engagement in recesses in the top walls. A cast metal bolster 34 extends between the side frames 2 with its ends projecting through the windows 9, the bolster being generally channel shape in section and comprising a top wall 36 and side walls 37. The bolster 34 is adapted to straddle the tie member 23 with its ends seated upon the resilient pads 32. Lugs 38 are formed on the pads for engagement in recesses formed in the top wall 36 of the bolster.

The bolster 34 is provided at each end thereof with sets of inboard and outboard lugs 39 and 41 extending laterally from the sidewalls 37 to straddle their respective side frame columns 8, the lugs being spaced from their respective guide surfaces 16 and 17 to permit limited relative lateral movements of the side frames. The top wall of the bolster is provided with the usual central bearing surface 42 and side bearing surfaces 43 to support a car body.

A wedge-shaped friction shoe 44 is mounted in each pocket 14 for frictional engagement against wear plates 46 welded to the bolster side walls 37. Helical compression springs 47 are seated at 48 on the side frame compression members 7 to engage and urge their respective shoes 44 downwardly for wedge engagement between the walls 13 and the wear plates 46.

During travel of the railway truck, it will be noted that the wheel and axle assemblies 3 and side frames 2 may follow a weaving line of travel without imparting lateral movements to a car body supported on the bolster, due to the manner in which the bolster is engaged to and supported on the side frames. It will also be noted that the spring groups 22, resilient rubber pads 32, and friction shoes 44 all coact to yieldably resist and dampen relative movements of the side frames and bolster to thereby materially decrease the possibility of damage to goods being transported on the car.

Figure 4:
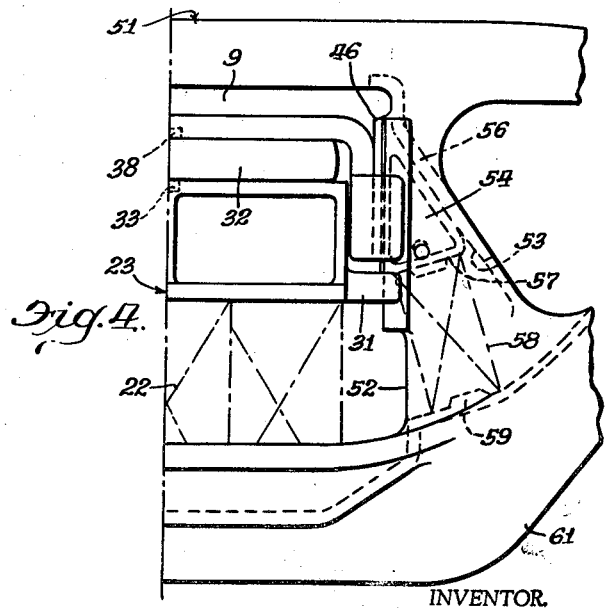
FIGURE 4 is a side elevation illustrating a modified form of the invention.

FIGURE 4 illustrates a modified form of the invention in which the side frames 51 are formed with columns 52 each having a friction shoe pocket 53 defined by spaced side walls 54 interconnected by an inclined wedge wall 56. A wedge-shaped friction shoe 57 is mounted in each pocket 53 and urged into wedge engagement between the wedge wall 56 and bolster wear plate 46 by means of a compression spring 58 seated at 59 on the side frame tension member 61. This embodiment of the invention is otherwise similar to the form heretofore shown and described.

Figure 5:
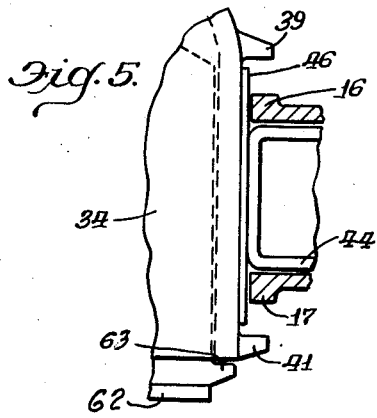
FIGURE 5 is a fragmentary section, corresponding to FIGURE 3 in that it is taken along the same line 3—3 of FIGURE 1 to illustrate another embodiment of the invention.
Figure 6:
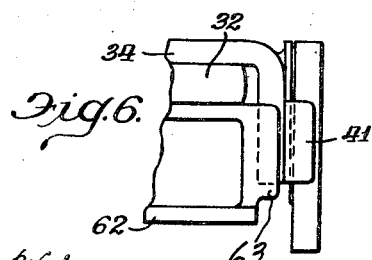
FIGURE 6 is a fragmentary side elevation of the structure shown in FIGURE 5.

FIGURES 5 and 6 illustrate another embodiment of the invention in which the tie member 62 is provided with two outboard lugs 63 at each end thereof for engagement against the ends of the bolster 34 to limit longitudinal movement of the tie member relative to the bolster. This embodiment of the invention is otherwise similar to the forms heretofore shown and described.

While the invention has been shown in several forms it will be obvious to those skilled in the art that it is not so limited, but is susceptible of various changes and modifications without departing from the spirit thereof or the scope of the depending claims.

I claim:

1. In a self-aligning spring plankless railway truck, spaced side frames having tension and compression members interconnected by spaced columns to define windows, wheel and axle assemblies supporting said side frames and journaled for free rotational and limited axial movements relative thereto, spring groups seated on said tension members, a tie member interconnecting said side frames and resiliently supported adjacent its ends upon said spring groups for vertical movement within said windows, pads of resilient material mounted upon said tie member adjacent the ends thereof, a bolster overlying said tie member and supported adjacent its ends upon said pads within said windows, and means securing the upper and lower surfaces of said pads to the bolster and tie member, respectively, whereby the pads serve to yieldably resist vertical, angular and longitudinal movements of the bolster relative to the tie member.

2. In a self-aligning spring plankless railway truck, spaced side frames having tension and compression members interconnected by spaced columns to define windows, wheel and axle assemblies supporting said side frames and journaled for free rotational and limited axial movements relative thereto, spring groups seated on said tension members, a tie member interconnecting said side frames and resiliently supported adjacent its ends upon said spring groups for vertical movement within said windows, pads of resilient material mounted upon said tie member adjacent the ends thereof, a bolster overlying said tie member and supported adjacent its ends upon said pads within said windows, and means securing the upper and lower surfaces of said pads to the bolster and tie member, respectively, whereby the pads serve to yieldably resist vertical, angular and longitudinal movements of the bolster relative to the tie member, said bolster having a top wall and depending side walls, said tie member and pads being arranged under said top wall and between said side walls.

3. In a self-aligning spring plankless railway truck, spaced side frames having tension and compression members interconnected by spaced columns to define windows, wheel and axle assemblies supporting said side frames and journaled for free rotational and limited axial movements relative thereto, spring groups seated on said tension members, a tie member interconnecting said side frames and resiliently supported adjacent its ends upon said spring groups for vertical movement within said windows, pads of resilient material mounted upon said tie member adjacent the ends thereof, a bolster overlying said tie member and supported adjacent its ends upon said pads within said windows, means securing the upper and lower surfaces of said pads to the bolster and tie member, respectively, whereby the pads serve to yieldably resist vertical, angular and longitudinal movements of the bolster relative to the tie member, said bolster having a top wall and depending side walls, said tie member and pads being arranged under said top wall and between said side walls, and a friction shoe mounted on a column to frictionally engage a bolster side wall and coacting with said pads to control movements of the bolster relative to the side frames and tie member.

4. In a self-aligning spring plankless railway truck, spaced side frames having tension and compression members interconnected by spaced columns to define windows, wheel and axle assemblies supporting said side frames and journaled for free rotational and limited axial movements relative thereto, spring groups seated on said tension members, a tie member interconnecting said side frames and resiliently supported adjacent its ends upon said spring groups for vertical movement within said windows, pads of resilient material mounted upon said tie member adjacent the ends thereof, a bolster overlying said tie member and supported adjacent its ends upon said pads within said windows, and means securing the upper and lower surfaces of said pads to the bolster and tie member, respectively, whereby the pads serve to yieldably resist vertical, angular and longitudinal movements of the bolster relative to the tie member, said bolster having a top wall and depending side walls, said tie member and pads being arranged under said top wall and between said side walls, friction shoes mounted on said columns to frictionally engage the bolster side walls and coact with said pads to control movements of the bolster relative to the side frames and tie member, and resilient means biasing said shoes against said side walls.

5. In a self-aligning spring plankless railway truck, spaced side frames having tension and compression members interconnected by spaced columns to define windows, wheel and axle assemblies supporting said side frames and journaled for free rotational and limited axial movements relative thereto, spring groups seated on said tension members, a tie member interconnecting said side frames and resiliently supported at its ends upon said spring groups for vertical movement within said windows, pads of resilient material mounted upon said tie member ends, a bolster overlying and having side walls straddling said tie member and secured adjacent its ends to said pads, sets of inboard and outboard lugs on the sides of said bolster straddling their respective columns, and outboard lugs on said tie member to engage the outboard sides of said columns, said pads having parallel upper and lower surfaces and being arranged in a common horizontal plane.

6. In a self-aligning spring plankless railway truck, spaced side frames having tension and compression members interconnected by spaced columns to define windows, wheel and axle assemblies supporting said side frames and journaled for free rotational and limited axial movements relative thereto, spring groups seated on said tension members, a tie member interconnecting said side frames and resiliently supported adjacent its ends upon said spring groups for vertical movement within said windows, pads of resilient material mounted upon said tie member adjacent the ends thereof, a bolster overlying said tie member and supported adjacent its ends upon said pads within said windows, and means securing the upper and lower surfaces of said pads to the bolster and tie member, respectively, whereby the pads serve to yieldably resist vertical, angular and longitudinal movements of the bolster relative to the tie member, said bolster having a top wall and depending side walls, said tie member and pads being arranged under said top wall and between said side walls, friction shoes mounted on said columns to frictionally engage the bolster side walls and coact with said pads to control movements of the bolster relative to the side frames and tie member, and resilient means biasing said shoes against said side walls, said shoes being wedge shaped as viewed in side elevation.

7. In a self-aligning spring plankless railway truck, spaced side frames having tension and compression members interconnected by spaced columns to define windows, wheel and axle assemblies supporting said side frames and journaled for free rotational and limited axial movements relative thereto, spring groups seated on said tension members, a tie member interconnecting said side frames and resiliently supported adjacent its ends upon said spring groups for vertical movement within said windows, pads of resilient material mounted upon said tie member adjacent the ends thereof, a bolster overlying said tie member and supported adjacent its ends upon said pads within said windows, and means securing the upper and lower surfaces of said pads to the bolster and tie member, respectively, whereby the pads serve to yieldably resist vertical, angular and longitudinal movements of the bolster relative to the tie member, said bolster having a top wall and depending side walls, said tie member and pads being arranged under said top wall and between said side walls, friction shoes mounted on said columns to frictionally engage the bolster side walls and coact with said pads to control movements of the bolster relative to the side frames and tie member, and resilient means biasing said shoes against said side walls, said shoes being wedge shaped as viewed in side elevation, said columns having spaced side walls interconnected by inclined back walls to define shoe pockets.

References Cited by the Examiner

UNITED STATES PATENTS

| | | | |
|---|---|---|---|
| 994,501 | 6/11 | Buhoup | 105—208.1 X |
| 1,399,709 | 12/21 | Holloway | 105—208.1 |
| 2,316,046 | 4/43 | Buckwalter | 105—208 |
| 2,510,353 | 6/50 | Travilla | 105—208.2 |
| 2,712,796 | 7/55 | Shafer | 105—197 |
| 2,740,359 | 4/56 | Travilla | 105—197 |
| 2,907,282 | 10/59 | Erzer | 105—197 |

LEO QUACKENBUSH, *Primary Examiner.*

JAMES S. SHANK, *Examiner.*